(12) United States Patent
Park et al.

(10) Patent No.: US 12,371,550 B2
(45) Date of Patent: Jul. 29, 2025

(54) METHOD FOR FABRICATING NANO-PARTICLE HAVING PEROVSKITE CRYSTALLINE STRUCTURE AND RESIN COMPOSITION INCLUDING THE NANO-PARTICLE

(71) Applicant: KOREA INSTITUTE OF MACHINERY & MATERIALS, Daejeon (KR)

(72) Inventors: Soyeon Park, Daejeon (KR); Jae-Hyun Kim, Daejeon (KR); Bongkyun Jang, Daejeon (KR); Bongsung Kim, Ansan-si (KR); Hyung Cheoul Shim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 459 days.

(21) Appl. No.: 17/799,343

(22) PCT Filed: Feb. 4, 2021

(86) PCT No.: PCT/KR2021/001443
§ 371 (c)(1),
(2) Date: Aug. 12, 2022

(87) PCT Pub. No.: WO2021/215634
PCT Pub. Date: Oct. 28, 2021

(65) Prior Publication Data
US 2023/0073504 A1 Mar. 9, 2023

(30) Foreign Application Priority Data

Apr. 24, 2020 (KR) .................. 10-2020-0050067

(51) Int. Cl.
*C08K 9/06* (2006.01)
*C08G 77/18* (2006.01)
*C08K 3/22* (2006.01)

(52) U.S. Cl.
CPC ................ *C08K 9/06* (2013.01); *C08G 77/18* (2013.01); *C08K 3/22* (2013.01);
(Continued)

(58) Field of Classification Search
CPC .... C08K 9/06; C08K 3/22; C08K 2003/2206; C08K 2003/2237; C08K 2201/011; C08K 3/16; C08G 77/18
See application file for complete search history.

(56) References Cited

U.S. PATENT DOCUMENTS 8,435,635 B2 * 5/2013 Alivisatos .............. B82Y 40/00
428/407

FOREIGN PATENT DOCUMENTS

CN 110684522 A 1/2020
KR 10-1878371 B1 7/2018

OTHER PUBLICATIONS

KR101878371B1 machine translation (Year: 2018).*
(Continued)

*Primary Examiner* — Mark Eashoo
*Assistant Examiner* — Caitlin Norine Illing
(74) *Attorney, Agent, or Firm* — Hauptman Ham, LLP (57) ABSTRACT

A method for fabricating a nano-particle includes preparing a nano-particle dispersion including a nano-particle having a perovskite structure with a first ligand on a surface thereof and a non-polar solvent; and mixing a silane compound, a halogen compound and the nano-particle dispersion to substitute a silane ligand for the first ligand.

10 Claims, 6 Drawing Sheets

SYNTHESIZING NANO-PARTICLE HAVING FIRST LIGAND — S10

SUBSTITUTING SECOND LIGAND FOR FIRST LIGAND — S20

(52) U.S. Cl.
CPC ............... *C08K 2003/2206* (2013.01); *C08K 2003/2237* (2013.01); *C08K 2201/011* (2013.01)

(56) References Cited

OTHER PUBLICATIONS

Victoria Gonzalez-Pedro et al., Recovery of shallow charge-trapping defects in CsPbX3 nanocrystals through specific binding and encapsulation with amino-functionalized silanes, Supporting Information, ACS Energy Letters, 2018, vol. 3, pp. 1409-1414. (Year: 2018).*

Jung Hyeon Yoo et al., "Synthesis of a silica coated fully-inorganic perovskite with enhanced moisture stability", New Journal of Chemistry, 2019, vol. 43, pp. 16685-16690.

Yun Hyeok Kim et al., "Photo-patternable quantum dots/siloxane composite with long-term stability for quantum dot color filters", ACS Applied Materials & Interfaces, Dec. 26, 2019, vol. 12, pp. 3961-3968.

Victoria Gonzalez-Pedro et al., "Recovery of shallow charge-trapping defects in CsPbX3 nanocrystals through specific binding and encapsulation with amino-functionalized silanes", ACS Energy Letters, 2018, vol. 3, pp. 1409-1414.

Jingrun Zhu et al., "Synthesis of CsPbBr3 perovskite nanocrystals with the sole ligand of protonated (3-aminopropyl)-triethoxysilane", Journal of Materials Chemistry C, vol. 7, May 30, 2019, pp. 7201-7206.

Jingrun Zhu et al., "Supplementary Materials for Synthesis of CsPbBr3 Perovskite Nanocrystals by Sole Ligand of Protonated (3-aminopropyl) Triethoxysilane", Journal of Materials Chemistry C, 2019, 12 pages, Supplementary Information of NPL No. 4.

Shuyi Huang et al., "Novel Fluorescence Sensor Based on All-Inorganic Perovskite Quantum Dots Coated with Molecularly Imprinted Polymers for Highly Selective and Sensitive Detection of Omethoate", ACS Applied Materials & Interfaces, 2018, vol. 10, pp. 39056-39063.

Yiqin Gong et al., "Stretch induced photoluminescence enhanced perovskite quantum dot polymer composites", Journal of Materials Chemistry C, vol. 8, pp. 1413-1420, Published on Dec. 8, 2019.

International Search Report issued Jul. 22, 2021, corresponding to International Application No. PCT/KR2021/001443.

* cited by examiner

| before substitution | after substitution |
|---|---|
|  |  |

METHOD FOR FABRICATING NANO-PARTICLE HAVING PEROVSKITE CRYSTALLINE STRUCTURE AND RESIN COMPOSITION INCLUDING THE NANO-PARTICLE

CROSS-REFERENCE TO RELATED APPLICATION

The present application is a national stage filing under 35 U.S.C § 371 of PCT application number PCT/KR2021/001443 filed on Feb. 4, 2021, which is based upon and claims the benefit of priorities to Korean Patent Application No. 10-2020-0050067 filed on Apr. 24, 2020, in the Korean Intellectual Property Office, which are incorporated herein in their entireties by reference.

BACKGROUND

1. Field

The present invention relates to a nano-particle. More particularly, the present invention relates to a method for fabricating a nano-particle having a perovskite crystalline structure and a resin composition including a nano-particle.

2. Description of the Related Art

A quantum dot is a nano-particle having semiconductive properties and having a size less than tens of nanometers. A quantum dot has properties different from a bulk particle due to quantum confinement effect. For example, a quantum dot can change a wavelength of a light absorbed thereby according to a size thereof. Furthermore, a quantum dot has novel optical, electrical and physical properties that the bulk particle does not have. Thus, researches are being actively conducted for manufacturing a photoelectric conversion device, a color conversion device or the like using a quantum dot.

Especially, a nano-particle having a perovskite crystalline structure is being researched in various fields because of its high photoluminescence efficiency. However, a nano-particle having a perovskite crystalline structure has a low stability in the air. In order to solve the problem, researches are being conducted for sealing a nano-particle with a silicone resin having a high impurities-blocking ability. However, a nano-particle having a perovskite crystalline structure is not dispersed well in the silicon resin.

SUMMARY

The present invention provides a method for fabricating a perovskite nano-particle having a silane ligand.

The present invention provides a resin composition including the nano-particle.

A method for fabricating a nano-particle according to an embodiment of the present invention includes preparing a nano-particle dispersion including a nano-particle having a perovskite structure with a first ligand on a surface thereof and a non-polar solvent; and mixing a silane compound, a halogen compound and the nano-particle dispersion to substitute a silane ligand for the first ligand.

In an embodiment, the first ligand includes a C3 to C18 alkyl chain.

In an embodiment, the non-polar solvent includes at least one selected from the group consisting of dichloroethylene, trichloroethylene, chloroform, chlorobenzene, dichlorobenzene, styrene, xylene, toluene and cyclohexane.

In an embodiment, the halogen compound includes at least one selected from the group consisting of a metal halide and an alkylammonium halide.

In an embodiment, the silane ligand is an X-type silane ligand having a functional group combined with the nano-particle and donating an electron to a cation of a surface of the nano-particle thereby forming a covalent binding.

In an embodiment, the silane compound includes at least one selected from the group consisting of 3-aminopropyl triethoxysilane, (3-mercaptopropyl)trimethoxysilane and trimethoxysilylpropanethiol, 3-(trihydroxysilyl)propylmethylphosphonate.

In an embodiment, a volume ratio of the silane compound and the dispersion is 0.01 to 0.001.

A siloxane resin composition according to an embodiment of the present invention includes a nano-particle having a perovskite structure with a silane ligand on a surface thereof; and siloxane resin including a hydrolytic or non-hydrolytic condensation reaction product derived from at least one silane compound selected from the group consisting of an organoalkoxysilane and organosilanediol.

In an embodiment, the hydrolytic or non-hydrolytic condensation reaction product derived from the silane compound includes an oligomer obtained from condensation reaction of an organoalkoxysilane and organosilanediol.

In an embodiment, a content of the nano-particle is 0.1 to 10 parts by weight to 100 parts by weight of the siloxane resin.

In an embodiment, the siloxane resin composition further includes a curing catalyst According to the present invention, a nano-particle having a perovskite crystalline structure with a silane ligand combined with a surface thereof may be obtained. The nano-particle has a high dispersibility in a siloxane resin. Thus, a mixture of the nano-particle and the siloxane resin may form a composite of the nano-particle and the siloxane resin with a high dispersibility and an improved stability.

DETAILED DESCRIPTION

Example embodiments are described more fully hereinafter with reference to the accompanying drawings. The inventive concept may, however, be embodied in many different forms and should not be construed as limited to the example embodiments set forth herein. In the drawings, the sizes and relative sizes of layers and regions may be exaggerated for clarity. It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
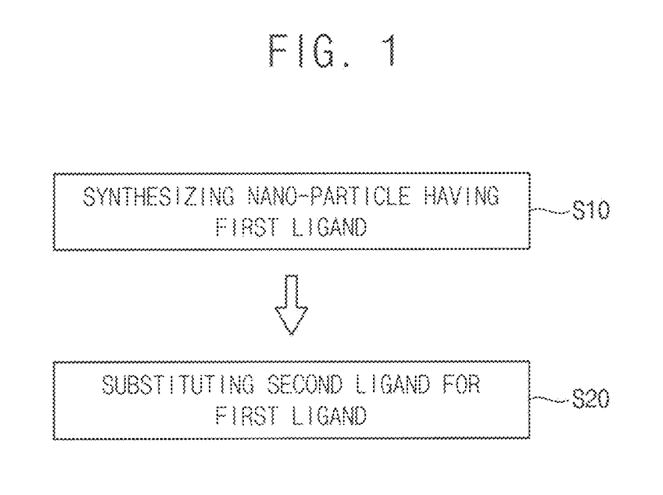
FIG. 1 is a flow-chart for explaining a method for fabricating a nano-particle having a perovskite crystalline structure according to an exemplary embodiment of the present invention.
Figure 2:
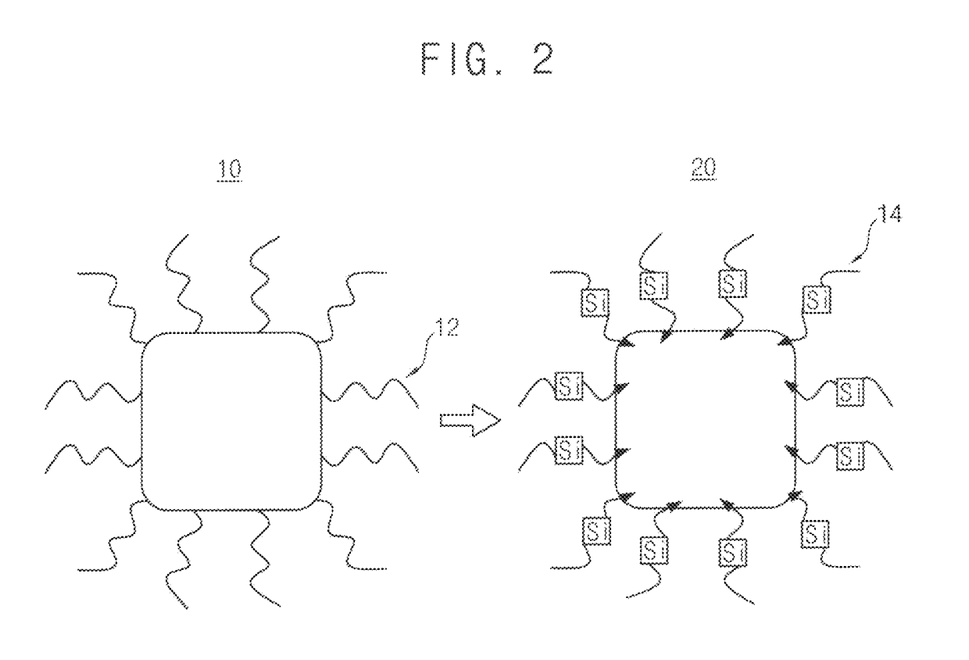
FIG. 2 is a schematic view for explaining a method for fabricating a nano-particle having a perovskite crystalline structure according to an exemplary embodiment of the present invention.

Method for Fabricating a Nano-Particle Having a Perovskite Crystalline Structure FIG. 1 is a flow-chart for explaining a method for fabricating a nano-particle having a perovskite crystalline structure according to an exemplary embodiment of the present invention. FIG. 2 is a schematic view for explaining a method for fabricating a nano-particle having a perovskite crystalline structure according to an exemplary embodiment of the present invention.

Referring to FIGS. 1 and 2, a nano-particle 10 having a perovskite crystalline structure with a first ligand 12 on a surface thereof is synthesized (S10). The nano-particle 10 may be a quantum dot including a semiconductive material and having a diameter of 1 nm to 100 nm.

For example, the nano-particle 10 may include a compound represented by the following Chemical Formula 1.

$$ABX_3 \qquad \text{[Chemical Formula 1]}$$

In Chemical Formula 1, A is a monovalent metal cation, B is a divalent metal cation, and X is a halogen anion. For example, A may be at least one metal selected from Rb, Cs and Fr, B may be at least one metal selected from Ge, Si, Sn and Pb, and X may be at least one metal selected from F, Cl, Br and I.

The perovskite crystalline structure may have a cubic crystal lattice. For example, the nano-particle 10 may have a shape of a cube or a hexahedron.

For example, the nano-particle 10 may be obtained from reaction of a first precursor containing the element A and a second precursor containing the element B. The second precursor may further contain a halogen element.

For example, the first precursor may include a metal carbonate, an alkylated metal compound, a metal alkoxide, a metal carboxylate, a metal acetylacetonate or a combination thereof, which contain the element A.

For example, when the element A is Cs, the first precursor may be Cs-oleate. For example, Cs-oleate may be obtained from reaction of oleic acid and a Cs-containing compound such as $Cs_2O_3$ or the like.

For example, the second precursor may include a Pb halide such as $PbCl_2$, $PbI_2$, $PbBr_2$ or the like, a Ge halide such as $GeCl_2$, $GeCl_4$, $GeI_2$, $GeI_4$, $GeBr_2$, $GeBr_4$ or the like, an Si halide such as $SiCl_2$, $SiCl_4$, $SiI_2$, $SiI_4$, $SiBr_2$, $SiBr_4$ or the like, a Sn halide such as $SnCl_2$, $SnI_2$, $SnBr_2$ or the like, or a combination thereof.

A reactant solution of the first precursor and the second precursor may further include an organic ligand compound. For example, the organic ligand compound may include RCOOH, $RNH_2$, $R_2NH$, $R_3N$, RSH, $R_3PO$, $R_3P$, ROH, RCOOR', $RPO(OH)_2$, $R_2POOH$, RCOOCOR' or a combination thereof. R and R' are independently substituted or non-substituted C1-C24 aliphatic hydrocarbon, or substituted or non-substituted C5-C24 aromatic hydrocarbon. The first ligand 12 may include a ligand from the organic ligand compound. For example, the organic ligand compound may include oleic acid, and the first ligand 12 may include an alkyl chain such as oleate. For example, the first ligand 12 may include a C3-C18 alkyl chain.

Reaction of the first precursor and the second precursor may be performed in a proper solvent. For example, the solvent may include a C6 to C22 primary amine such as hexadecyl amine; a C6 to C22 secondary amine such as dioctyl amine; a C6 to C40 tertiary amine such as trioctyl amine; a heterocyclic compound having a nitrogen atom such as pyridine; a C6 to C40 aliphatic hydrocarbon (e.g., an alkane, an alkene, or an alkyne) such as hexadecane, octadecane, octadecene, squalane, or the like; a C6 to C30 aromatic hydrocarbon such as phenyl dodecane, phenyl tetradecane, phenyl hexadecane, or the like; a phosphine substituted with a C6 to C22 alkyl group such as trioctyl phosphine; a phosphine oxide substituted with a C6 to C22 alkyl group such as trioctyl phosphine oxide; a C12 to C22 aromatic ether such as phenyl ether, benzyl ether, or the like; and a combination thereof.

Thereafter, a second ligand 14 is substituted for the first ligand 12 (S20).

For the ligand substitution, the nano-particle 10 may be dispersed in a non-polar organic solvent. For example, the non-polar organic solvent may include dichloroethylene, trichloroethylene, chloroform, chlorobenzene, dichlorobenzene, styrene, xylene, toluene, cyclohexane or a combination thereof.

In an embodiment, the second ligand 14 may be a silane ligand. In an embodiment, the second ligand 14 may be an X-type silane ligand. An X-type ligand may mean a ligand having a functional group donating an electron to a cation of a surface of the nano-particle thereby forming a covalent binding.

In an embodiment, a silane compound may be provided to form the second ligand 14.

For example, the silane compound for forming an X-type silane ligand may have an amino group, a thiol group or a phosphonate group. For example, the silane compound may include 3-aminopropyl triethoxysilane, (3-mercaptopropyl) trimethoxysilane, trimethoxysilylpropanethiol, 3-(trihydroxysilyl)propylmethylphosphonate or the like.

In an embodiment, a volume ratio of the silane compound to a dispersion including the nano-particle 10 and the non-polar solvent may be 0.01 to 0.001. When the volume ratio of the silane compound to the dispersion is more than 0.01, aggregation of the nano-particle 10 may appear.

Because the silane compound has a polarity, using dispersion including a polar solvent or a polar aprotic solvent may be preferable when the silane compound is used in a ligand-substituting reaction. However, a perovskite nano-particle may be easily decomposed in a polar solvent. According to an embodiment of the present invention, a halogen compound may be added to progress a ligand-substituting reaction using the silane compound in a non-polar organic solvent. When the halogen compound and the X-type silane compound are used together, reactivity between the functional group of the silane compound and a surface of the perovskite nano-particle may increase so that the silane compound may effectively react with the perovskite nano-particle in the non-polar organic solvent.

For example, the halogen compound may be added with 1 parts by weight to 100 parts by weight of the nano-particle dispersion. The halogen compound remaining after the ligand-substituting reaction may be removed through centrifugation or the like.

For example, the halogen compound may include a metal halide, an alkylammonium halide or a combination thereof. For example, the metal halide may include halides of zinc, lead, germanium, silicon, tin, cadmium, mercury, gallium, indium, titanium, copper, aluminum, lithium, sodium, potassium, magnesium, calcium, strontium, silver, platinum, palladium, nickel, iron, chromium, manganese or zirconium, or a combination thereof.

For example, the alkylammonium halide may include methylammonium iodide, formamidinium iodide, acetamidinium iodide, benzylammonium iodide, t-butylammonium iodide, dimethylammonium iodide, guanidinium iodide, imidazolium iodide, formamidinium bromide, methylammonium bromide, methylammonium chloride or a combination thereof.

According to embodiments of the present invention, a nano-particle 20 having a perovskite crystalline structure with a silane ligand combined with a surface thereof may be obtained. The nano-particle 20 has a high dispersibility in a siloxane resin. Thus, a mixture of the nano-particle 20 and the siloxane resin may form a composite of the nano-particle and the siloxane resin with a high dispersibility and an improved stability.

Siloxane Resin Composition Including a Nano-Particle

A resin composition according to an embodiment of the present invention includes a nano-particle and a siloxane resin. The nano-particle may be substantially same as the nano-particle having a surface combined with a silane ligand and having a perovskite crystalline structure, which is previously explained with reference to FIGS. 1 and 2. Thus, any duplicated explanation may be omitted.

The siloxane resin may include a hydrolytic or non-hydrolytic condensation reaction product derived from at least one silane compound selected from the group consisting of an organoalkoxysilane and organosilanediol.

For example, the organoalkoxysilane may include tetraethoxysilane, tetramethoxysilane, N-(3-acryloxy-2-hydroxypropyl)-3-aminopropyltriethoxysilane, N-3-(acryloxy-2-hydroxypropyl)-3-aminopropyltrimethoxysilne, N-3-(acryloxy-2-hydroxypropyl)-3-aminopropyltripropoxysilne, 3-acryloxypropylmethylbis(trimethoxy)silane, 3-acryloxypropyltrimethoxysilane, 3-acryloxypropyltriethoxysilane, 3-acryloxypropyltripropoxysilane, 3-(meth)acryloxypropyltrimethoxysilane, 3-(meth)acryloxypropyltrimethoxysilane, 3-(meth)acryloxypropyltripropoxysilane, 2-(3,4-epoxycyclohexyl)ethyltrimethoxysilane, 2-(3,4-epoxycyclohexyl)ethyltriethoxysilane, vinyltrimethoxysilane, vinyltriethoxysilane, vinyltripropoxysilane, methyltrimethoxysilane, methyltriethoxysilane, methyldimethoxysilane, methyldiethoxysilane, phenyltrimethoxysilane, phenyltriethoxysilane, diphenyldimethoxysilane, diphenyldiethoxysilane, N-(aminoethyl-3-aminopropyl)trimethoxysilane, N-(2-aminoethyl-3-aminopropyl)triethoxysilane, 3-aminopropyltrimethoxysilane, 3-aminopropyltriethoxysilane, 3-isocyanatopropyltriethoxysilane, heptadecafluorodecyltrimethoxysilane, chloropropyltrimethoxysilane, chloropropyltriethoxysilane or a combination thereof.

For example, the organosilanediol may include diphenylsilanediol, diisobutylsilanediol or a combination thereof.

In an embodiment, the siloxane resin may include an oligomer obtained from condensation reaction of an organoalkoxysilane and organosilanediol.

After the condensation reaction to obtain the siloxane resin, byproducts such as methanol need to be removed. Methanol remaining in the siloxane resin may decompose the nano-particle having a perovskite crystalline structure. Furthermore, the byproducts-removing process may be preferably performed at a low temperature, for example, at a room temperature. When the siloxane resin is heated to remove the byproducts, a viscosity thereof may be changed. For example, the byproducts-removing process may be performed through vacuum treatment.

In an embodiment, a content of the nano-particle may be 0.1 to 10 parts by weight to 100 parts by weight of the siloxane resin.

The siloxane resin composition may further include a curing catalyst. The curing catalyst may include various materials that are known as materials capable of promoting condensation reaction of silane groups. For example, a photo-curing catalyst such as 2,2-dimethoxy-2-phenylacetophenone or the like may be used, however, embodiments are not limited thereto.

The siloxane resin composition may form a network structure through condensation reaction of a silane ligand of the nano-particle and a silane group of the siloxane resin. Thus, the nano-particle may be encapsulated in a matrix having a network structure, and properties of the nano-particle may be prevented from being deteriorated by external impurities such as humidity.

Furthermore, because of having a silane ligand, the nano-particle may be stably dispersed in the siloxane resin composition. Thus, reliability and photoluminescence efficiency of a nano-particle composited formed from the siloxane resin composition may be improved.

Hereinafter, embodiments of the present invention will be explained with reference to specific synthetic examples and experiments.

Example 1—Synthesis of Perovskite Nano-Particle Having Silane Ligand 0.407 g of $CsCO_3$, 1.25 ml of oleic acid and 25 ml of 1-octadecene were put in a three-neck flask, and heated up to 120° C. with being stirred in a vacuum condition, and then maintained for 30 minutes. Thereafter, the mixture was heated up to 135° C. under $N_2$ flow to prepare a first solution. Oleic acid and oleylamine were mixed with each other by a volume ratio of 1:1 and put in a three-neck flask, and heated up to 120° C. with being stirred in a vacuum condition. Thereafter, the mixture was heated up to 135° C. under $N_2$ flow to prepare a second solution. Thereafter, 1.2 mmol of PbBr$_2$ and 25 ml of 1-octadecene were put in a three-neck flask, and heated up to 120° C. with being stirred in a vacuum condition. Thereafter, N$_2$ was provided to prepare a third solution. 7.5 ml of the second solution was added to the third solution. After becoming transparent, the mixture was heated up to 170° C. Thereafter, 3 ml of the first solution was rapidly injected into the mixture. After 10 seconds, the mixture was cooled to a room temperature by using ice water thereby obtaining perovskite (CsPbBr$_3$) nano-particles having oleate ligands. In order to remove byproducts, the reaction product was centrifuged, rinsed and dispersed in toluene.

10 ml of dispersion of the perovskite nano-particles (10 mg/ml), 0.1 g of methylammonium bromide and 20 μℓ of (3-mercaptopropyl)methyldimethoxy silane were mixed with each other and stirred for 1 hour under nitrogen atmosphere. Thereafter, the reaction product was centrifuged for 30 minutes at 12,000 rpm to remove remaining silane and halogen compounds. Thus obtained nano-particles were dispersed in toluene.

Figure 3:
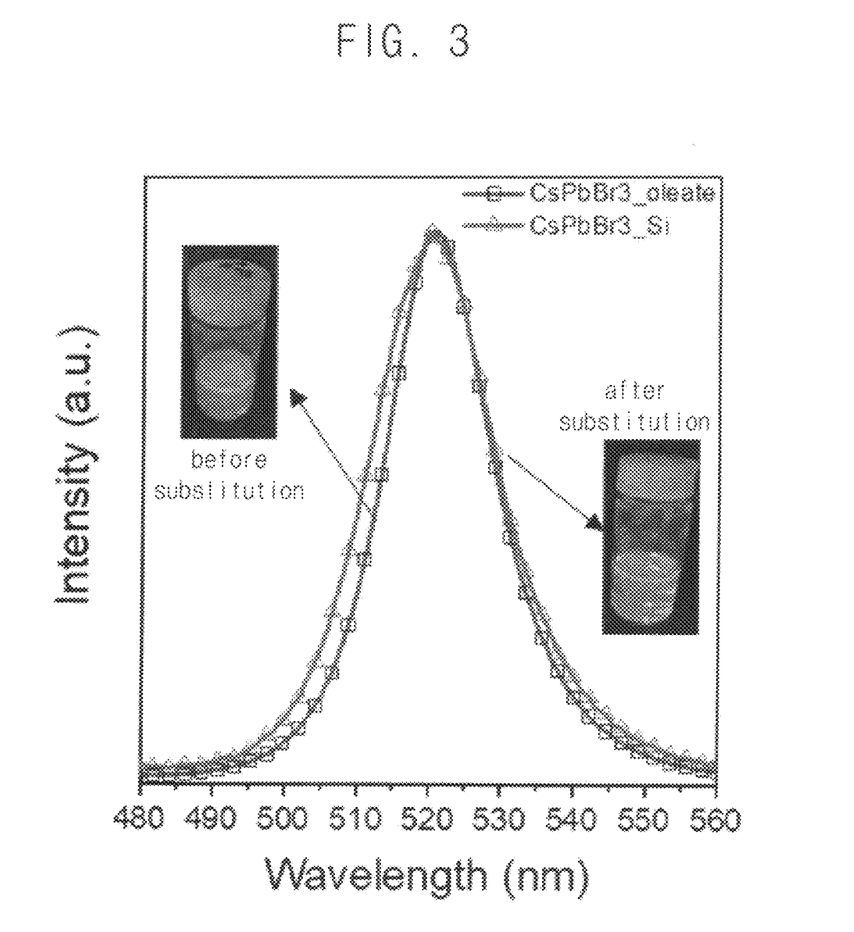
FIG. 3 is a graph with pictures, which show photoluminescence of the nano-particles of Example 1 before and after ligand substitution.
Figure 4:
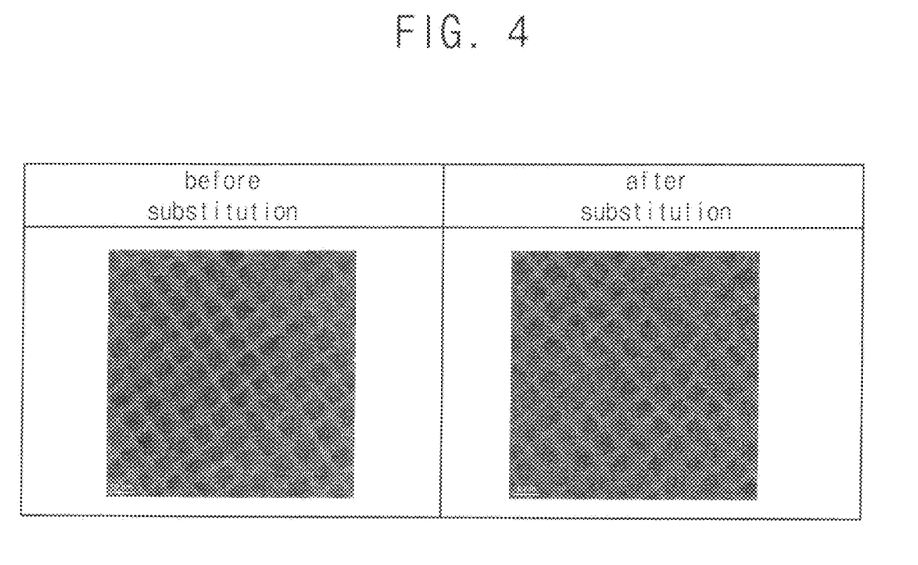
FIG. 4 shows transmission electron microscopy (TEM) images of the nano-particles of Example 1 before and after ligand substitution.
Figure 5:
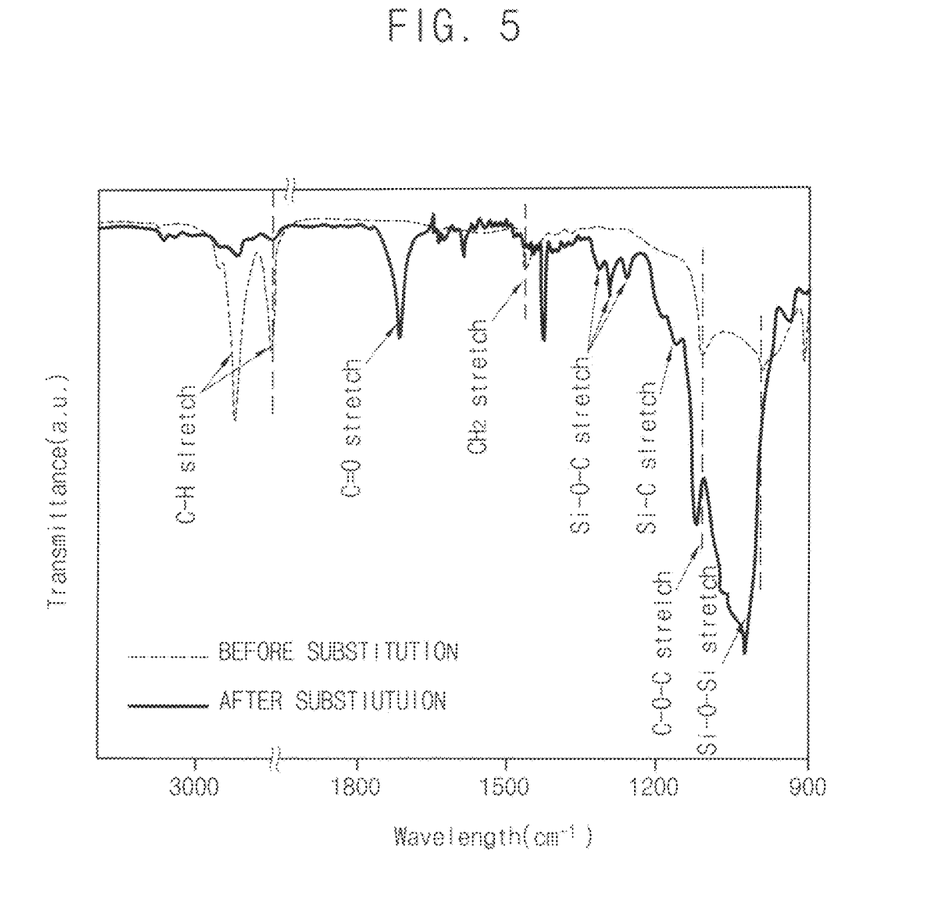
FIG. 5 is a FT-IR graph of the nano-particles of Example 1 before and after ligand substitution.

FIG. 3 is a graph with pictures, which show photoluminescence of the nano-particles of Example 1 before and after ligand substitution. FIG. 4 shows transmission electron microscopy (TEM) images of the nano-particles of Example 1 before and after ligand substitution. FIG. 5 is a FT-IR graph of the nano-particles of Example 1 before and after ligand substitution.

Referring to FIGS. 3 and 4, it can be noted that characteristics of the nano-particles were hardly changed after ligand substitution with compared to before ligand substitution. Referring to FIG. 5, it can be noted that silane ligands were substituted for oleate ligands of the nano-particles through Example 1.

Example 2—Preparation of Siloxane Resin Composition and Fabrication of Cured Body 3-(meth)acryloxypropyltrimethoxysilane and diphenylsilanediol were put in a two-neck flask of 250 ml by a mole ration of 1:1, and Ba(OH)$_2$·H$_2$O was added thereto as a catalyst by 0.1 mol % to silane. Thereafter, the mixture were stirred for 5 hours at 85° C. to obtain a siloxane resin through non-hydrolytic condensation reaction. Thereafter, the reaction product was filtered to remove Ba(OH)$_2$·H$_2$O, and vacuum-treated for 1 hour at a room temperature to remove methanol that is a byproduct.

The reaction product was cooled to a room temperature in N$_2$ atmosphere. Thus obtained siloxane resin was mixed with 50 ml of the nano-particle dispersion of Example 1 such that the content of the nano-particle was 1 parts by weight to 100 parts by weight of the siloxane resin. Thereafter, the mixture was mixed for 2 hours until an organic solvent therein was entirely volatilized. Thereafter, a photo-curing catalyst (2,2-dimethoxy-2-phenylacetophenone) was added thereto by 0.2 parts by weight to 100 parts by weight of the siloxane resin composition thereby obtaining a siloxane resin composition including a nano-particle having a silane ligand.

The siloxane resin composition was put in a mold of 5 mm×5 mm with a thickness of 0.5 mm, and exposed to a UV lamp having a wavelength of 365 nm for 10 minutes to fabricate a cured body.

Comparative Example 1

The nano-particle dispersion of Example 1 and a commercially available acrylic resin were mixed such that the content of the nano-particle was 1 parts by weight to 100 parts by weight of the acrylic resin. Thereafter, the mixture was mixed for 2 hours until an organic solvent therein was entirely volatilized thereby obtaining an acrylic resin composition including a nano-particle having a silane ligand.

The acrylic resin composition was put in a mold of 5 mm×5 mm with a thickness of 0.5 mm, and exposed to a UV lamp having a wavelength of 365 nm for 10 minutes to fabricate a cured body.

Figure 6:
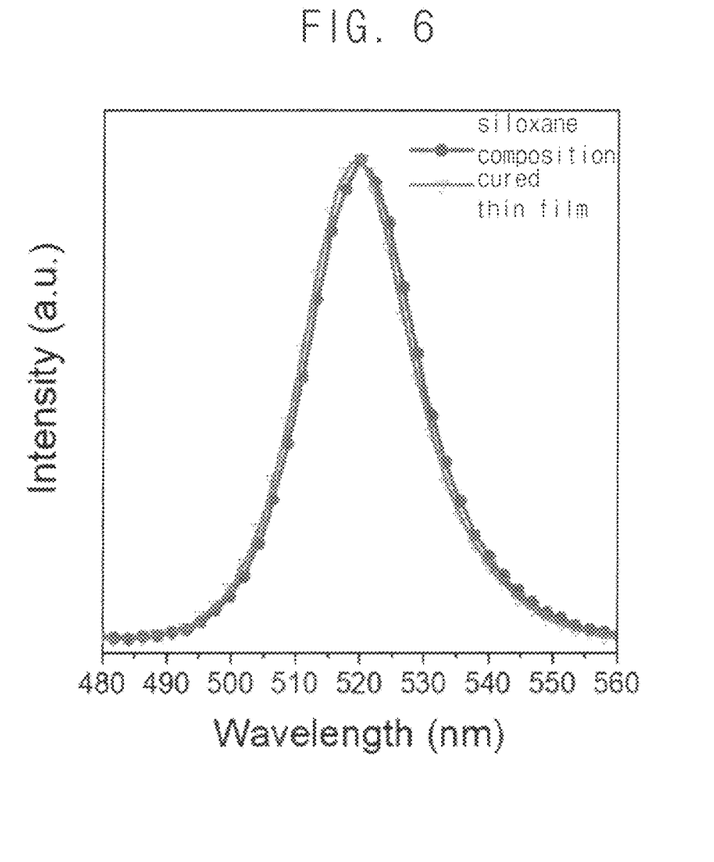
FIG. 6 is a graph showing photoluminescence of the siloxane resin composition of Example 2 and the cured body therefrom.

FIG. 6 is a graph showing photoluminescence of the siloxane resin composition of Example 2 and the cured body therefrom. Referring to FIG. 6, photoluminescence was substantially same between before cured and after cured. Thus, it can be noted that the siloxane resin composition of Example 2 has photoluminescence stability against curing.

Figure 7:
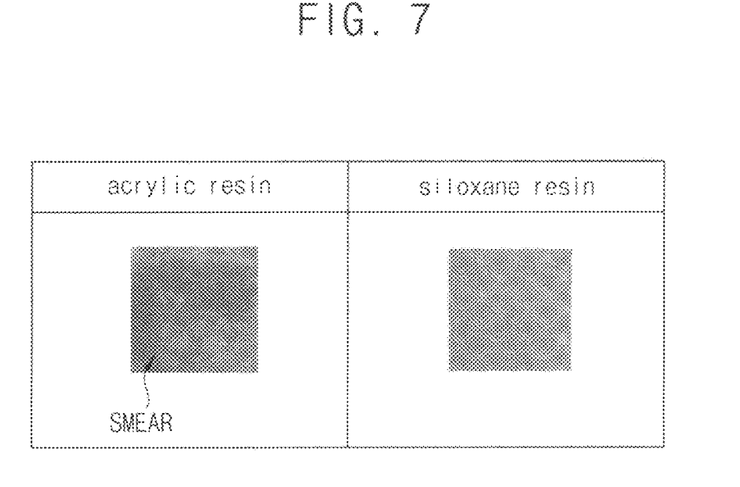
FIG. 7 shows pictures showing photoluminescence of the siloxane resin composition of Example 2 and the acrylic resin composition of Comparative Example 1.

FIG. 7 shows pictures showing photoluminescence of the siloxane resin composition of Example 2 and the acrylic resin composition of Comparative Example 1. Referring to FIG. 7, it can be noted that the nano-particles were uniformly dispersed in the composition of Example 2 even if the nano-particles were not uniformly dispersed in the acrylic resin composition.

Figure 8:
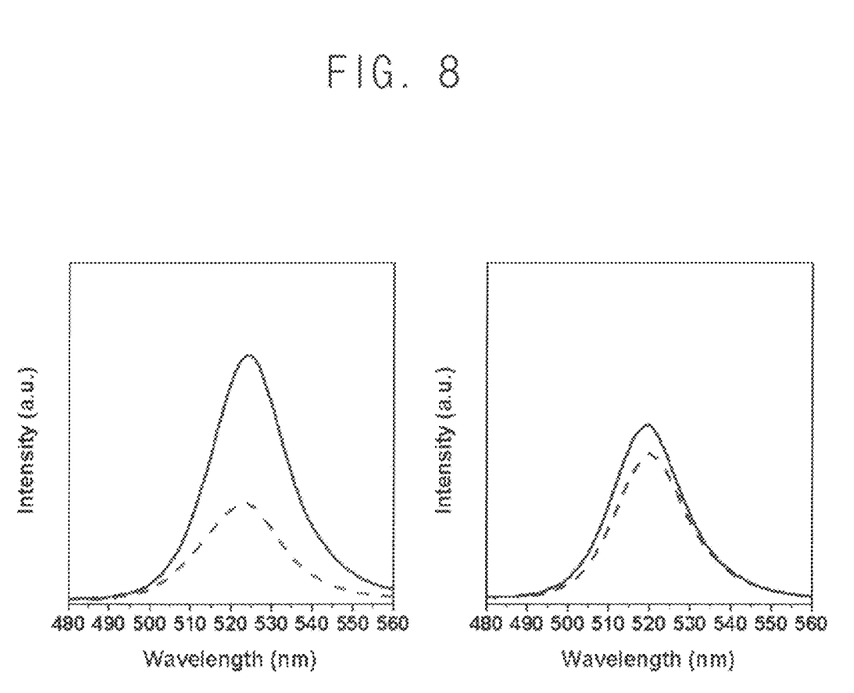
FIG. 8 shows graphs showing photoluminescence of the cured bodies formed from the siloxane resin composition of Example 2 and the acrylic resin composition of Comparative Example 1 before and after kept in the air for 1 month.

FIG. 8 shows graphs showing photoluminescence of the cured bodies formed from the siloxane resin composition of Example 2 and the acrylic resin composition of Comparative Example 1 before and after kept in the air for 1 month. In FIG. 8, continuous lines represent photoluminescence right after the compositions were cured, and dotted lines represent photoluminescence 1 month after the compositions were cured. Referring to FIG. 8, it can be noted that the cured body formed from the composition of Example 2 has photoluminescence stability after time lapsed even if the photoluminescence efficiency of the cured body formed from the acrylic resin composition was reduced after time lapsed.

The foregoing is illustrative and is not to be construed as limiting thereof. Although a few exemplary embodiments have been described, those skilled in the art will readily appreciate that many modifications are possible in the exemplary embodiments without materially departing from the novel teachings, aspects, and advantages of the invention. Accordingly, all such modifications are intended to be included within the scope of this disclosure.

The present invention may be used for fabrication of nano-particles, an electronic device or an optical device using nano-particles such as a light source, a solar cell, a display device or the like.

REFERENCE NUMERALS

10: nano-particle
12: first ligand
14: second ligand
20: nano-particle combined with silane ligand

What is claimed is:

1. A method for fabricating a nano-particle, the method comprising:
    preparing a nano-particle dispersion including a nano-particle having a perovskite structure with a first ligand on a surface thereof and a non-polar solvent; and
    mixing a silane compound, a halogen compound and the nano-particle dispersion to substitute a silane ligand for the first ligand,
    wherein the halogen compound includes at least one selected from the group consisting of a metal halide and an alkylammonium halide.

2. The method of claim 1, wherein the first ligand includes a C3 to C18 alkyl chain.

3. The method of claim 1, wherein the non-polar solvent includes at least one selected from the group consisting of dichloroethylene, trichloroethylene, chloroform, chlorobenzene, dichlorobenzene, styrene, xylene, toluene and cyclohexane.

4. The method of claim 1, wherein the silane ligand is an X-type silane ligand having a functional group combined with the nano-particle and donating an electron to a cation of a surface of the nano-particle thereby forming a covalent binding.

5. The method of claim 4, wherein the silane compound includes at least one selected from the group consisting of 3-aminopropyl triethoxysilane, (3-mercaptopropyl) trimethoxysilane, trimethoxysilylpropanethiol, and 3-(trihydroxysilyl) propylmethylphosphonate.

6. The method of claim 1, wherein a volume ratio of the silane compound to the dispersion is 0.01 to 0.001.

7. A siloxane resin composition comprising:
a nano-particle fabricated by the method of claim 1; and
a siloxane resin including a hydrolytic or non-hydrolytic condensation reaction product derived from at least one silane compound selected from the group consisting of an organoalkoxysilane and organosilanediol, wherein the siloxane resin is free of methanol.

8. The siloxane resin composition of claim 7, wherein the hydrolytic or non-hydrolytic condensation reaction product derived from the silane compound includes an oligomer obtained from condensation reaction of an organoalkoxysilane and organosilanediol.

9. The siloxane resin composition of claim 7, wherein a content of the nano-particle is 0.1 to 10 parts by weight to 100 parts by weight of the siloxane resin.

10. The siloxane resin composition of claim 7, further comprising a curing catalyst.

* * * * *